June 12, 1928.  
O. ZERK, NOW BY JUDICIAL CHANGE OF NAME O. U. ZERK  
1,672,972  
LUBRICATING APPARATUS  
Filed March 14, 1921
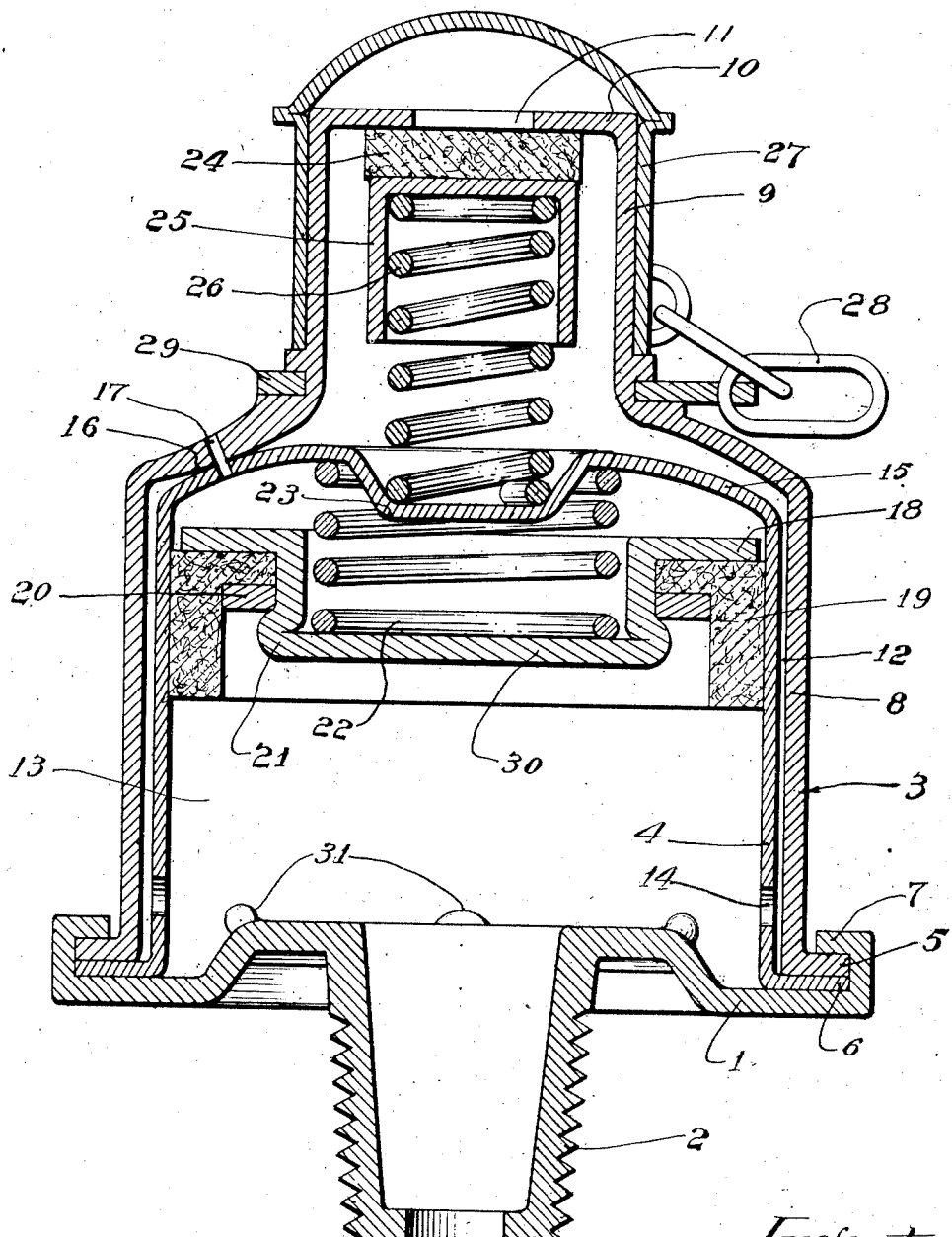
Inventor:  
Oscar U. Zerk  
By: Williams, Bradbury,  
McCaleb & Hinkle  
Attorneys Patented June 12, 1928.

1,672,972

UNITED STATES PATENT OFFICE.

OSCAR ZERK, NOW BY JUDICIAL CHANGE OF NAME OSCAR ULYSSES ZERK, OF CLEVELAND, OHIO, ASSIGNOR, BY MESNE ASSIGNMENTS, TO THE BASSICK MANUFACTURING COMPANY.

LUBRICATING APPARATUS.

Application filed March 14, 1921. Serial No. 452,124.

My invention relates to lubricating apparatus, and is particularly concerned with grease- or oil cups of the reservoir type in which a quantity of lubricant is gradually forced from the cup to the bearing by means of a spring actuated piston.

An object of my invention is to provide a new and improved lubricant cup of the reservoir type.

Another object is to provide a reservoir cup which may be cheaply manufactured.

Another object is to provide an automatically feeding lubricant cup which only requires to be filled with lubricant and which will then feed the lubricant to the bearing without further attention.

Another object is to provide a device in which the threaded portions are all of small diameter, whereby the use of drawn steel is facilitated.

Other objects and advantages will appear as the description proceeds.

The single figure of the drawing is a vertical sectional view of the device on an enlarged scale.

The device, in general, comprises a lubricant chamber, an inlet passageway leading thereto and provided with a check valve therein for admitting the lubricant and preventing its escape, and means for automatically forcing the lubricant through an outlet passage connecting the lubricant chamber with a part to be lubricated.

My new and improved reservoir cup has a base member 1 which forms one end of the lubricant reservoir and is provided with a hollow threaded nipple 2 which serves to secure the cup to a part to be lubricated and which also provides an outlet passage connecting the lubricant chamber with the part to be lubricated. Mounted on the base 1 are the cover or dome 3 and interliner 4 having laterally projecting flanges 5 and 6, respectively, firmly clamped to the base 1 by the bent over portion 7 thereof. The dome or cover 3 has a large cylindrical part 8 surrounding the interliner 4 and a smaller cylindrical part 9 adapted to be connected to a source of lubricant supply and having a flat end portion 10 provided with an inlet opening 11 through which the lubricant is forced into the interior of the cup.

The interliner 4 is of generally cylindrical shape and of slightly smaller diameter than the enlarged part 8 of the cover 3, thus providing a passageway 12 therebetween which passageway communicates with the inlet opening 11 and with the lubricant chamber 13 by means of openings 14 through the interliner and adjacent the lower edge thereof. The top portion 15 of the interliner abuts the cover or dome at 16 and at this point I provide a vent 17 which connects the upper portion of the chamber formed in the interliner 4 with the atmosphere.

Within the chamber formed by the interliner 4 I mount a piston member composed of an upper cup plate 18, a cup leather 19 and a retaining ring 20. The cupped plate 18 may have a circumferential projection 21 formed to retain the ring 20 and cup leather 19 in position. A spring 22 is provided for forcing the piston downwardly to create pressure in the chamber and feed the lubricant to the bearing. One end of this spring seats in the cupped portion of the plate 18 and the other end rests against the portion 15 of the interliner 4, being maintained in central position by the downwardly projecting part 23 of the portion 15.

The inlet opening 11 is normally closed by a check valve which in the present form is illustrated as comprising a washer 24 of suitable material for effecting a seal with that portion of the end 10 which surrounds the opening 11. This washer is attached to a cup 25 pressed upwardly by a spring 26 having its lower end resting in the depressed part 23 of the upper portion of the interliner. In order to more effectively exclude dust and dirt from the interior of my new and improved lubricant cup, I provide a dust cap 27 which normally surrounds and covers the inlet end of the cup. I have shown this dust cap as attached by means of a chain 28 to a ring 29 firmly held in a groove formed in the upper end of the cover 3.

The operation of my invention is as follows: The dust cap 27 is first removed from the inlet end of the cup and said inlet connected to a source of lubricant supply. The lubricant is forced through the inlet opening 11 urging the check valve comprising the washer 24 and cup 25, against the action of the spring 26, thus permitting the lubricant to pass through said inlet, down the passageway 12 formed between the cover 3 and interliner 4, and through the openings 14 into the chamber 13 where the lubricant will force the piston 18 upwardly against the tension of the spring 22, the air escaping from above the piston through the vent 17. During the filling operation some lubricant may be fed to the bearing and after the chamber 13 has been filled with lubricant, this lubricant is fed to the bearing by the spring actuated piston 18 which continues to feed lubricant to the bearing until the part 30 thereof contacts with the projections 31 formed on the base 1. These projections limit the downward movement of the piston 18 and stop said piston in such a position that there is clearance between the underside of the piston and the base 1 so that the fresh charge of lubricant forced through the inlet 11 may act on the entire under side of the piston and force it upward against the tension of the spring 22.

It will be seen that I have provided a device in which all of the threaded members are of small diameter. This is important where the parts are to be made of drawn steel, as it is difficult and expensive to form accurate threads on a member of large diameter on account of the hardness of the steel, and if threads are inaccurately formed, the lubricant is likely to leak.

Having thus illustrated and described the preferred embodiment of my invention, what I claim and desire to secure by United States Letters Patent is:

1. A grease cup comprising a lubricant chamber, a piston slidably mounted in said chamber, said piston having a laterally extending flange and a depression within said flange, a cup-leather sealing ring having a downwardly turned peripheral portion and carried on the laterally extending flange, the downwardly turned portion making contact at its periphery with the side walls of the chamber, and an upper portion seated on the laterally extending flange, a compression spring having its lower portion extending within said depression in the piston and its upper portion pressing against the upper wall of the chamber, and a lubricant conducting member extending above the upper wall of the chamber and adapted to communicate lubricant under pressure to the under side of the piston to raise said piston, compressing said spring and causing a sealing by the leather ring between the piston and the side walls of the chamber.

2. A grease cup comprising a chamber having an axial outlet and a peripheral inlet at the same end, a conducting member having an external axial inlet opposite said outlet and extending to said chamber inlet, a piston in said chamber spring pressed toward the outlet, and a spring pressed check valve in said external inlet.

3. A grease cup comprising a chamber having an axial outlet and a peripheral inlet at the same end, a conducting member having an external axial inlet opposite said outlet and extending to said chamber inlet, a piston in said chamber, a check valve in said external inlet, said piston having a central cup opening toward said external inlet, said chamber having a smaller cup axially in line with said first cup and opening toward said external inlet, a compression spring socketed by both said cups for pressing said piston toward the outlet, and a compression spring socketed at one end by said chamber cup for holding said check valve closed.

4. A grease cup comprising a chamber having an axial outlet and a peripheral inlet at the same end, a conducting member having an external axial inlet opposite said outlet and extending to said chamber inlet, a piston in said chamber, a check valve in said external inlet, said piston having a central cup opening toward said external inlet, said chamber having a cup axially in line with said first cup, a compression spring socketed by both said cups for pressing said piston toward the outlet, and a compression spring socketed at one end by said chamber cup for holding said check valve closed.

5. A grease cup comprising a cylindrical chamber, an axially slidable piston therein, resilient means pressing on said piston, said chamber having an axial outlet and peripheral inlet at the same end, and a cover member defining an axial receiving connection outside said chamber at the end opposite said outlet, and an annular passage from said connection to said inlet.

6. A grease cup comprising a chamber, said chamber having an axial outlet and a peripheral inlet at the same end, and a cover member defining an axial receiving connection outside said chamber at the end opposite said outlet, and a passage from said connection to said inlet.

In testimony whereof, I hereunto affix my signature.

OSCAR ZERK,
Now by judicial change of name Oscar Ulysses Zerk.